(12) United States Patent
Mumma et al.

(10) Patent No.: US 9,476,578 B2
(45) Date of Patent: Oct. 25, 2016

(54) DODECAHEDRONALLY-SHAPED ILLUMINATION DEVICE WITH ORIENTATION DETECTOR

(71) Applicants: Richard Mumma, Southlake, TX (US); Yale Spitzer, Chicago, IL (US); Brian Harris, Forth Worth, TX (US)

(72) Inventors: Richard Mumma, Southlake, TX (US); Yale Spitzer, Chicago, IL (US); Brian Harris, Forth Worth, TX (US)

(73) Assignee: International Development LLC, Roanoke, TX (US)

( * ) Notice: Subject to any disclaimer, the term of this patent is extended or adjusted under 35 U.S.C. 154(b) by 336 days.

(21) Appl. No.: 14/212,249

(22) Filed: Mar. 14, 2014

(65) Prior Publication Data

US 2014/0268700 A1    Sep. 18, 2014

Related U.S. Application Data

(60) Provisional application No. 61/792,567, filed on Mar. 15, 2013.

(51) Int. Cl.

| F21L 4/02 | (2006.01) |
|---|---|
| F21V 23/04 | (2006.01) |
| F21V 25/12 | (2006.01) |
| F21L 4/08 | (2006.01) |
| F21Y 101/02 | (2006.01) |
| F21Y 105/00 | (2016.01) |
| F21Y 111/00 | (2016.01) |

(52) U.S. Cl.
CPC ............. *F21V 23/0492* (2013.01); *F21L 4/02* (2013.01); *F21V 25/12* (2013.01); *F21L 4/08* (2013.01); *F21Y 2101/02* (2013.01); *F21Y 2105/001* (2013.01); *F21Y 2111/007* (2013.01)

(58) Field of Classification Search
CPC ... F21Y 2111/007; F21L 15/02; F21L 15/08; F21L 7/00; F21L 11/00
See application file for complete search history.

(56) References Cited

U.S. PATENT DOCUMENTS

| 5,066,011 A | 11/1991 | Dykstra et al. | |
|---|---|---|---|
| 5,537,111 A * | 7/1996 | Martin | B64F 1/18 315/364 |
| 6,042,487 A | 3/2000 | Schrimmer et al. | |
| 6,076,946 A * | 6/2000 | Brouillette, III | F21V 15/01 362/183 |
| 6,499,860 B2 * | 12/2002 | Begemann | F21K 9/135 362/230 |
| 6,746,885 B2 * | 6/2004 | Cao | F21V 3/00 257/E25.02 |
| 7,340,830 B2 * | 3/2008 | Liu | F21K 9/00 29/829 |
| 7,736,020 B2 * | 6/2010 | Baroky | F21K 9/135 362/245 |
| 8,770,794 B2 * | 7/2014 | Moeck | F21V 29/004 362/249.03 |
| 2004/0114367 A1 * | 6/2004 | Li | F21K 9/135 362/248 |
| 2012/0320592 A1 | 12/2012 | Zhou | |
| 2016/0003463 A1 * | 1/2016 | Rodinger | F21K 9/1355 362/249.02 |

\* cited by examiner

*Primary Examiner* — Ismael Negron
(74) *Attorney, Agent, or Firm* — Brian E. Harris

(57) ABSTRACT

An illumination device includes a plurality of light panels facing in different directions and having light emitting elements, a user-operable power switch, an orientation detector for detecting the current orientation of the illumination device, and a controller for receiving information from the orientation detector and the user-operable power switch, and controlling electrical power to the light emitting elements based on such information. A timer, used for automatic shutoff and/or delayed-on functionality, might also be included. The controller is configured to operate in one or more different operational modes, which can be preset and/or user-selectable.

11 Claims, 3 Drawing Sheets

DODECAHEDRONALLY-SHAPED ILLUMINATION DEVICE WITH ORIENTATION DETECTOR

This application claims the benefit of U.S. Provisional Application No. 61/792,567, filed 15 Mar. 2013, which is hereby incorporated herein by reference.

TECHNICAL FIELD

The present disclosure relates to lighting apparatus, particularly portable lighting apparatus configured to emit light in multiple directions.

SUMMARY

According to some aspects of the present disclosure, a lighting apparatus comprises a plurality of light panels each facing a respective different direction, each light panel including at least one respective light emitting element; an orientation detector for detecting an orientation of the lighting apparatus; and a controller for receiving orientation information from the orientation detector and for controlling electrical power to the light emitting elements based at least in part on the orientation information.

In some embodiments, the lighting apparatus can comprise, for example, twelve light panels assembled in the shape of a dodecahedron.

In some embodiments, at least one of the light panels can comprise a diffuser. The diffuser can be formed of an at least somewhat fire-resistant material.

In some embodiments, the lighting apparatus can further comprise a user-operable mode selection switch for allowing a user to select from among a plurality of operational modes. In some such embodiments, the controller can be further configured for controlling electrical power to the light emitting elements based at least in part on a selected one the plurality of operational modes.

In some embodiments, the controller can be further configured for controlling electrical power to the light emitting elements based at least in part on a preselected one of a plurality of operational modes.

In some embodiments, the lighting apparatus can further comprise a rechargeable battery for providing electrical power for the at least one light emitting element.

In some embodiments, at least one of the light emitting elements can be a light emitting diode.

In some embodiments, the lighting apparatus can further comprise a power switch for allowing a user to turn on the lighting apparatus. In some such embodiments, the lighting apparatus can further comprise a timer for detecting an amount of time since a user operated a power switch.

BRIEF DESCRIPTION OF THE DRAWINGS

Features, aspects, and embodiments of the present disclosure are described in conjunction with the attached drawings, in which.

DETAILED DESCRIPTION

Figure 1:
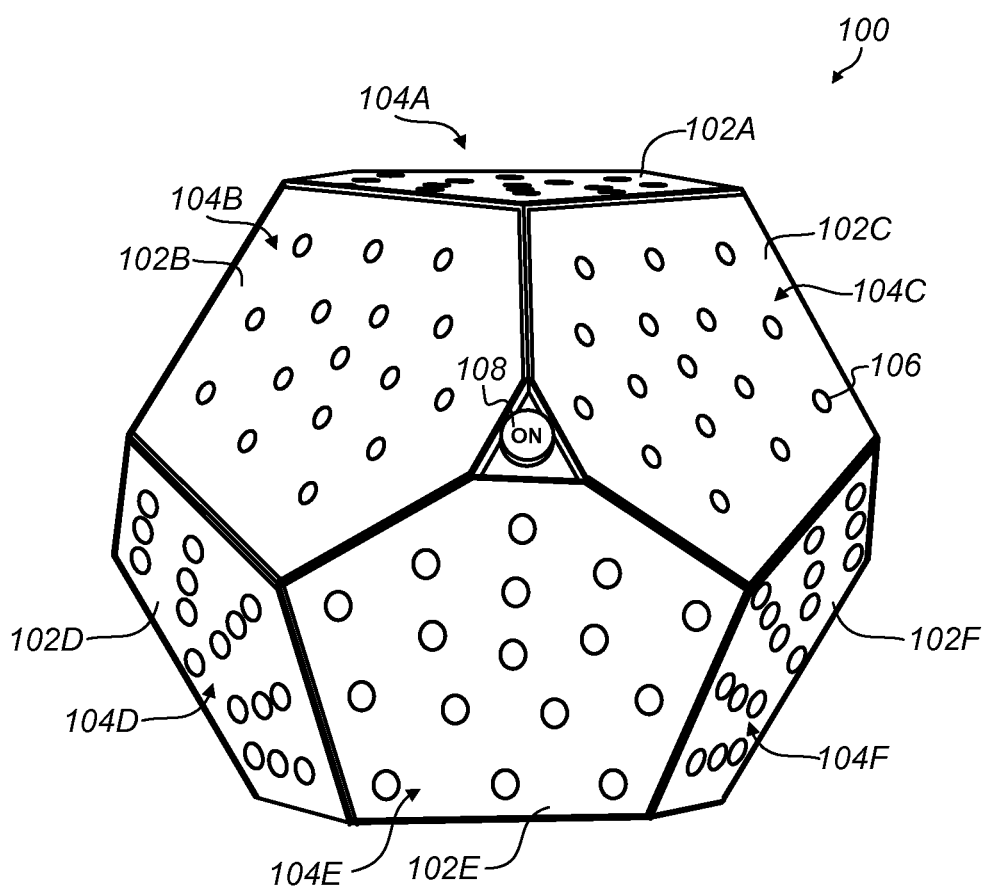
FIG. 1 shows a top front perspective view of an embodiment of a multisided lighting apparatus 100 according to the present disclosure.
Figure 2:
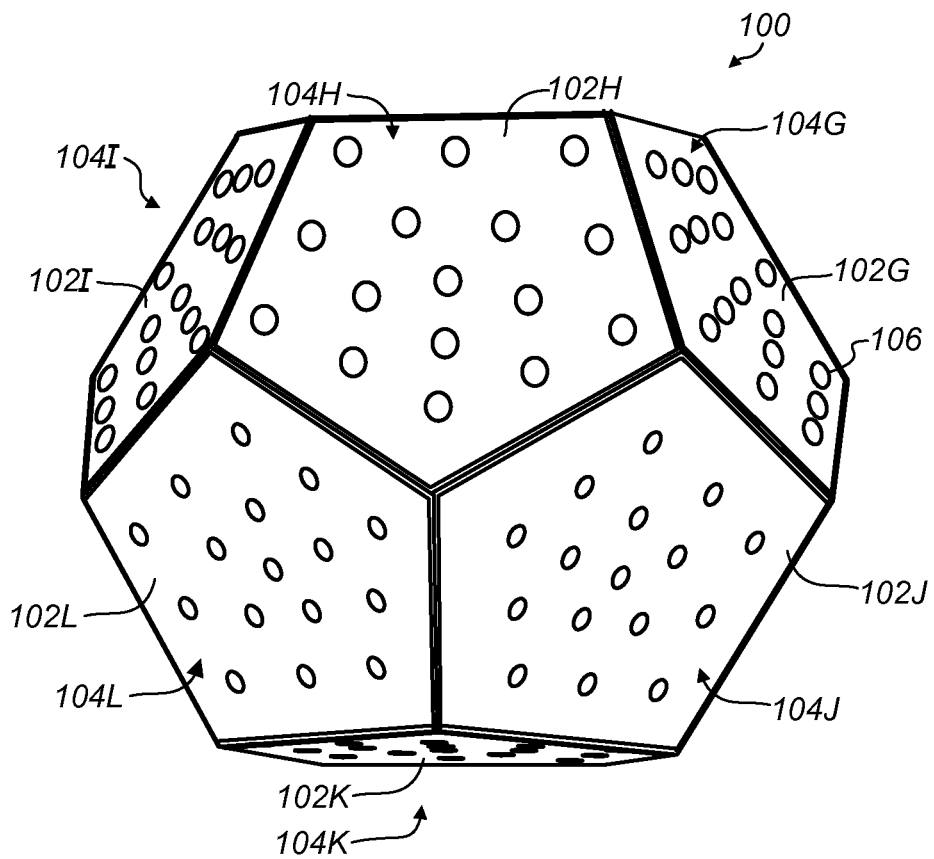
FIG. 2 shows a bottom rear perspective view of the lighting apparatus shown in FIG. 1.

FIG. 1 shows a top front perspective view of an embodiment of a multisided lighting apparatus 100 according to the present disclosure. FIG. 2 shows a bottom rear perspective view of the lighting apparatus 100. The lighting apparatus 100 is shaped somewhat like a dodecahedron, however other shapes with more or fewer sides can be used, including, but not limited to embodiments where the apparatus 100 is shaped at least somewhat like a cube, tetrahedron, octahedron, icosahedron, pyramid, cuboid, cube octahedron, buckyball (truncated icosahedron), star, or sphere.

The lighting apparatus 100 comprises twelve light panels 102A-102L corresponding to respective sides of the lighting apparatus 100. However, other numbers of light panels 102 can be used. In general, it is desirable to have a light panel 102 on each side so that at least somewhat omnidirectional light can be emitted by the lighting apparatus 100.

Each of the light panels 102A-102L includes a respective one of light emitting element arrays 104A-104L. The light emitting element arrays 104A-104L each includes one or more light emitting elements 106. In the present embodiment, each light emitting element array 104 includes sixteen light emitting elements 106. However, other numbers of light emitting elements 106 can be used per light emitting element array 104, including a single light emitting element 106 per light emitting element array 104.

The light emitting elements 104 are preferably light emitting diodes (LEDs), however other types of light emitting elements can be used. Characteristics and exact numbers of light emitting elements 104 can vary greatly from one embodiment to another. For example, light emitting elements 104 of different colors and/or brightness levels can be used depending on the intended use of the lighting apparatus 100. In some embodiments, bright white light may be desired, while in other embodiments it may be desirable to have light of one or more other colors or even light that is not visible to the human eye such as infrared light. In some embodiments, light emitting elements 104 can be of the type that are capable of emitting more than one different color of light.

In the illustrated embodiment, the lighting apparatus 100 includes a single power switch 108 for allowing a user to turn on and off at least some of the light emitting elements 106. In some such embodiments, the power switch 108 can be a push-button switch, a toggle switch, a rotary switch, or any other desired type of power switch.

Figure 3:
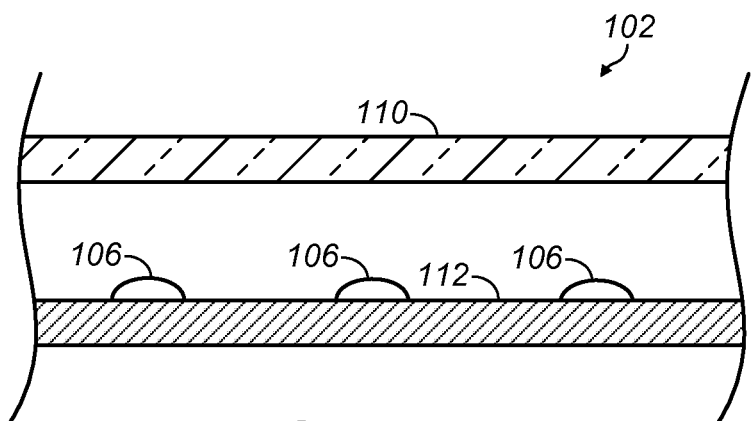
FIG. 3 shows a partial cross-sectional view of a light panel according to the present disclosure.

FIG. 3 shows a partial cross-sectional view of a light panel 102, which can be representative of any of the light panels 102A-102L. As shown in FIG. 3, the light panel 102 includes one or more light emitting elements 106 oriented to emit light through a diffuser 110. The diffuser 110 can be completely transparent, or can have optical properties that reduce, color, and/or spread light passing therethrough. The light emitting elements 106 are supported by a rigid substrate 112. Additional components, such as wiring and/or circuitry for providing electrical power to the light emitting elements 106, can be included in the light panel 102 but is not shown in FIG. 3.

Figure 4:
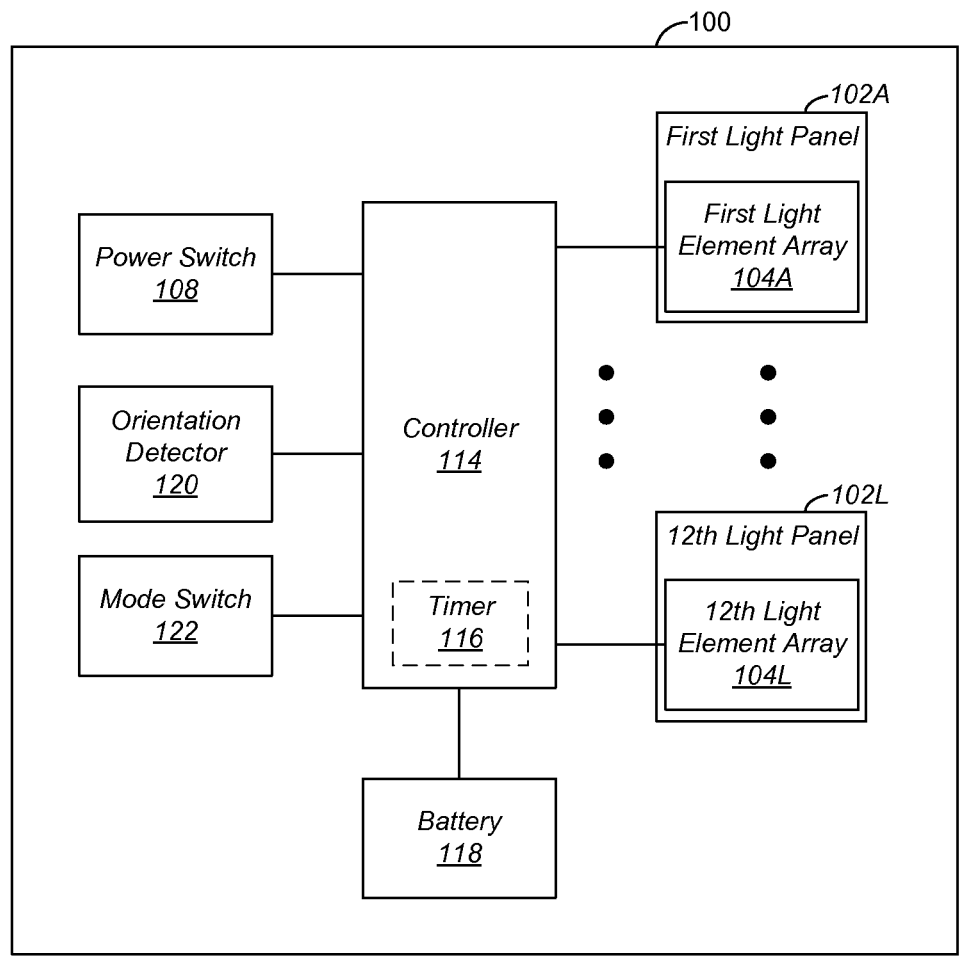
FIG. 4 shows a block diagram of the lighting apparatus shown in FIG. 1.

FIG. 4 shows a block diagram of the lighting apparatus 100. As discussed above, the lighting apparatus 100 includes a plurality of light panels 102A-102L, each having a respective light emitting element array 104A-104L. The light emitting element arrays 104A-104L are controlled by a controller 114. The controller 114 is connected to the power switch 108, allowing the controller 114 to detect when the power switch 108 has been operated by a user so that the controller 114 can take appropriate action, for example turning on or off various light emitting element arrays 104.

Electrical power for the light emitting elements 106 and other electrical components is provided by a battery 118. The battery 118 can be replaceable and/or rechargeable. Embodiments that include a rechargeable battery 118 can also include means for recharging the battery 118 without removing the battery 118 from the lighting apparatus 100, for example by providing the lighting apparatus 100 with recharging electrical leads that can be electrically connected to an external power source, and/or by wirelessly recharging the battery 118 for example using an electromagnetic field charger.

In some embodiments, the lighting apparatus 100 can include a timer 116, either integrated into the controller 114 or as a separate unit. In such embodiments, the timer 116 can be used for an automatic shut-off feature, where the light emitting elements 106 are automatically turned off by the controller 114 after a predetermined amount of time has elapsed, as determined by the timer 116, since a user operated the power switch 108 to turn on the light emitting elements 106. Alternatively, or additionally, the timer 116 can be used for an on-delay feature, where the controller 114 waits for a predetermined amount of time to turn on the light emitting elements 106, the predetermined amount of time being measured by the timer 116 from the time that a user operates the power switch 108 to turn on the light emitting elements 106.

In some embodiments, the lighting apparatus 100 can include an orientation detector 120. For example, the orientation detector 120 can include a gravity switch or other detector that can be used to detect which of the light panels 102A-102L is facing down or which of the light panels 102A-102L is facing up. In some such embodiments, this information can be used by the controller 114 to determine which of the light emitting element arrays 104A-104L to turn on or to turn off.

In some embodiments, the lighting apparatus 100 can include a mode switch 122. The mode switch 122 can be user-accessible or factory preset. The mode switch 122 can allow the lighting apparatus 100 to operate in one of a plurality of different operational modes. The operational modes can include modes the light emitted from the lighting apparatus 100 is directed in a different direction or cone shape depending on the selected mode. Some such operational modes can benefit from the inclusion of the orientation detector 120.

For example, in some embodiments, the operational modes can include one or more of an upward-spotlight mode, an upward-floodlight mode, and downward-floodlight mode.

In the upward-spotlight mode, if the lighting apparatus is oriented as shown in FIGS. 1 and 2, then only the single most upward-facing light emitting array 104A will be illuminated by the controller 114. If the lighting apparatus 100 includes the orientation detector 120, the controller 114 can determine, based on information from the orientation detector 120, that the current most upwardly-facing light panel is light panel 102A, so only the light emitting element array 104A will be illuminated while the lighting apparatus is "ON". If the lighting apparatus 100 is rotated from the orientation shown in FIGS. 1 and 2, the orientation detector 120 can detect the change, relay this information to the controller 114, which in turn can turn on and off the light emitting arrays 104A-104L as appropriate so that only the light emitting element array 104 that currently faces a most upward direction will be on.

In the upward-floodlight mode, if the lighting apparatus is oriented as shown in FIGS. 1 and 2, then only the group of somewhat upwardly-facing light emitting arrays 104A, 104B, 104C, 104G, 104H, and 104I will be illuminated by the controller 114. If the lighting apparatus 100 includes the orientation detector 120, the controller 114 can determine, based on information from the orientation detector 120, that the current most upwardly-facing light panel is light panel 102A, so only the light emitting element array 104A and neighboring light emitting element arrays 104B, 104C, 104G, 104H, and 104I will be illuminated while the lighting apparatus is "ON". If the lighting apparatus 100 is rotated from the orientation shown in FIGS. 1 and 2, the orientation detector 120 can detect the change, relay this information to the controller 114, which in turn can turn on and off the light emitting arrays 104A-104L as appropriate so that only the light emitting element arrays 104 that currently face a somewhat upward direction will be on.

In the downward-floodlight mode, if the lighting apparatus is oriented as shown in FIGS. 1 and 2, then only the group of somewhat downwardly-facing light emitting arrays 104D, 104E, 104F, 104J, and 104L (excluding the ground-facing light emitting array 104K) will be illuminated by the controller 114. If the lighting apparatus 100 includes the orientation detector 120, the controller 114 can determine, based on information from the orientation detector 120, that the current ground-facing light panel is light panel 102K, so only the light emitting element arrays 104D, 104E, 104F, 104J, and 104L will be illuminated while the lighting apparatus is "ON". If the lighting apparatus 100 is rotated from the orientation shown in FIGS. 1 and 2, the orientation detector 120 can detect the change, relay this information to the controller 114, which in turn can turn on and off the light emitting arrays 104A-104L as appropriate so that only the light emitting element arrays 104 that currently face a somewhat downward direction (but not directly facing the ground) will be on.

Still further modes are possible, such as modes that turn on only side-facing light emitting element arrays (e.g., light emitting element arrays 104B-104J and 104L as oriented in FIGS. 1 and 2) or modes that cause the light emitting element arrays 104A-104L to flash or turn on and off together, in groups, or individually, including modes where the light emitting element arrays 104A-104L turn on and off in predetermined or random sequences.

In some embodiments, the lighting apparatus 100 can be configured for use by fire and rescue emergency personnel. For example, some such embodiments of the lighting apparatus 100 can have a very rugged construction, and include fire-rated materials, such as fire proof or fire resistant metals and plastics, so that the lighting apparatus 100 can be used inside a smoke-filled room during search and rescue operations, for example within a burning structure. In some such embodiments, the lighting apparatus 100 can be preconfigured to operate in the above-described downward-floodlight mode. Such embodiments can allow fire and rescue personnel to quickly and easily turn on the lighting apparatus 100 and deploy the lighting apparatus 100 into a smoke-filled structure without the need to be concerned with careful placement. Preferably, such embodiments include the orientation detector 120 so that the lighting apparatus 100 can be tossed into a smoke-filled room, automatically determine its orientation, and illuminate only the somewhat downwardly-facing light panels 102 so that the ground instantly becomes flooded with light. The upwardly-facing light panels 102 can automatically remain off, preventing personnel from being blinded by the bright light being reflected by smoke.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A lighting apparatus, comprising:
a plurality of light panels each facing a respective different direction, each light panel including at least one respective light emitting element;
an orientation detector for detecting an orientation of the lighting apparatus;
a controller for receiving orientation information from the orientation detector and for controlling electrical power to the light emitting elements based at least in part on the orientation information.

2. The lighting apparatus of claim 1, wherein the light apparatus comprises twelve light panels assembled in the shape of a dodecahedron.

3. The lighting apparatus of claim 1, wherein the controller is further configured for controlling electrical power to the light emitting elements based at least in part on a preselected one of a plurality of operational modes.

4. The lighting apparatus of claim 1, further comprising a rechargeable battery for providing electrical power for the at least one light emitting element.

5. The lighting apparatus of claim 1, wherein at least one of the light emitting elements is a light emitting diode.

6. The lighting apparatus of claim 1, wherein at least one of the light panels comprises a diffuser.

7. The lighting apparatus of claim 6, wherein the diffuser is formed of at least fire resistant material.

8. The lighting apparatus of claim 1, further comprising a user-operable mode selection switch for allowing a user to select from among a plurality of operational modes.

9. The lighting apparatus of claim 8, wherein the controller is further configured for controlling electrical power to the light emitting elements based at least in part on a selected one the plurality of operational modes.

10. The lighting apparatus of claim 1, further comprising a power switch for allowing a user to turn on the lighting apparatus.

11. The lighting apparatus of claim 10, further comprising a timer for detecting an amount of time since a user operated a power switch.

* * * * *